(12) United States Patent
Nakagawa

(10) Patent No.: US 6,678,173 B2
(45) Date of Patent: Jan. 13, 2004

(54) POWER SUPPLY APPARATUS FOR THE REDUCTION OF POWER CONSUMPTION

(75) Inventor: Shin Nakagawa, Tokyo (JP)

(73) Assignee: Fidelix Y.K., Tokyo (JP)

( * ) Notice: Subject to any disclaimer, the term of this patent is extended or adjusted under 35 U.S.C. 154(b) by 0 days.

(21) Appl. No.: 10/076,828

(22) Filed: Feb. 15, 2002

(65) Prior Publication Data

US 2002/0118552 A1 Aug. 29, 2002

Related U.S. Application Data

(62) Division of application No. 09/638,853, filed on Aug. 15, 2000, which is a division of application No. 09/070,609, filed on Sep. 30, 1998, now Pat. No. 6,104,622.

(30) Foreign Application Priority Data

| Apr. 30, 1997 | (JP) | .............................................. 9-126385 |
| May 28, 1997 | (JP) | .............................................. 9-154452 |
| Jul. 28, 1997 | (JP) | .............................................. 9-217105 |
| Jan. 12, 1998 | (JP) | .............................................. 9-16342 |
| Mar. 10, 1998 | (JP) | .............................................. 9-78294 |

(51) Int. Cl.$^7$ ............................. H02M 1/12; G05F 1/44
(52) U.S. Cl. ............................. 363/44; 363/82; 323/286
(58) Field of Search .............................. 363/39, 44, 45, 363/46, 48, 81, 82, 125, 40, 47; 323/222, 282, 286, 287, 290

(56) References Cited

U.S. PATENT DOCUMENTS

| 5,636,112 A | * | 6/1997 | Faulk ........................... 363/48 |
| 5,844,790 A | * | 12/1998 | Jacobs et al. .................. 363/47 |
| 6,490,181 B1 | * | 12/2002 | Liu et al. ...................... 363/40 |

* cited by examiner

*Primary Examiner*—Jessica Han
(74) *Attorney, Agent, or Firm*—Norris McLaughlin & Marcus

(57) ABSTRACT

A power supply apparatus having an AC power supply, a transformer, a switching element and a control circuit for controlling an operation of the switching element: where an electrical current is supplied to the primary side of the transformer intermittently when a main unit of an electrical appliance to which the power supply apparatus is applied is in a standby mode so that unnecessary power consumption is reduced. Further, a capacitance is provided between the AC power supply and the control circuit instead of the conventional initializing resistance and the control circuit is driven using an electrical current going through a reactance component of the capacitor, so that the energy loss is not caused any more by the initializing resistance.

3 Claims, 12 Drawing Sheets

POWER SUPPLY APPARATUS FOR THE REDUCTION OF POWER CONSUMPTION

This application is a divisional of U.S. Ser. No. 09/638,853 filed Aug. 15, 2000 which was a divisional of U.S. Ser. No. 09/070,609 filed Apr. 30, 1998 now U.S. Pat. No. 6,104,622.

BACKGROUND OF THE INVENTION

1) Field of the Invention

The present invention relates to a power supply apparatus, and particularly, relates to apparatuses where electrical power consumption can be greatly reduced. The power supply apparatus according to the invention can be suitably applied to any electrical appliance having a remote controlling system, such as television equipment, video equipment, audio equipment and air conditioning systems; electrical appliances where a sub-switch is provided to change the operational mode between a standby mode and a driving mode; electrical appliances, which should keep them in their standby mode even when the main functions of the appliance are not being used, such as telephone equipment, facsimile equipment and personal computers; or electrical appliances, such as modems and printers, which are designed such that electrical power is supplied through AC adapters.

2) Related Prior Arts

A remote controlling system is used in many kinds of electrical appliances, due to its convenience. Recently, such appliances are so designed that a main switch for turning on or off the main unit of these appliances is omitted and thus the appliances always keep their standby mode for receiving an on/off signal from the remote controller during when the main unit is not being used. Further, in some of these appliances, the main switch is omitted but a small sub-switch is equipped to switch the function mode between a standby mode and a driving mode. Appliances having a remote controlling system are always in a standby mode in order to watch and wait a remote controlling signals; and the appliances having a sub-switch are also always in a standby mode so that it makes possible to put the appliance in a driving mode every time even if the main unit of the appliance is not working. Therefore, either appliances always consume some electrical power for watching and waiting for a signal even when the main units of the appliances do not work.

Telecommunication appliances, such as telephone equipment and facsimile equipment, should always keep themselves in a standby condition for telecommunication signals. Therefore, in order to keep the standby function, a certain amount of electrical power is always being consumed in these appliances. Further, in the electrical equipment using an AC adapter, even if the main switch is turned off, only the secondary side of a transformer of the AC adapter is turned off, however the primary side is always kept on. Therefore, as long as the equipment is connected to a commercial AC power supply, some wasted power, so-called "no-load loss", is always consumed in the AC adapter.

FIG. 1 is a block diagram showing a basic circuit construction of an electrical power supply for use in a typical electrical appliances, such a having a remote controlling system, a timer display, etc. an audio equipment, television and video equipment. In FIG. 1, an alternative electrical current is supplied into a main unit 102 of the electrical appliance through a commercial AC power supply input terminal 101. The main unit 102 includes a main power supply (not shown) for supplying electrical voltage and current to conduct the main functions of the appliance.

On the power supply line from the commercial AC power supply 101 to the main unit 102, is provided a switching device 103, which is operated so as to open or close the power supply line in accordance with a signal coming from a control circuit 104 for use in a remote controlling function.

In the control circuit 104, are provided an auxiliary power supply 105, a light receiving circuit 106 for receiving a remote controlling signal, a CPU 107 for outputting several kinds of control signals for driving the main unit 102, and a timer 108 for displaying a time; these elements constituting the control circuit 104 are driven by an electrical current supplied via the auxiliary power supply apparatus 105. In response to the remote control signal coming from outside, the CPU 107 sends a signal to the switching device 103 to close the circuit for supplying electrical power from the commercial AC power supply 101 to the main unit 102 and the CPU 107 also sends control signals to the main unit 102 for controlling the functions thereof.

The timer 108, which is necessary to be driven even during when the appliance is in a standby mode, is provided in the circuit 104 to drive a liquid crystal display 109 to display a time thereon. However, since a back light system 110 for the liquid crystal display 109 consumes a great amount of power, the system 110 is arranged so as not to be lit on during the standby mode but to be lit on only when the main unit 102 is in a driving mode by obtaining power from the main power supply apparatus provided in the main unit 102.

The control circuit 104 also comprises an electrical charge storing element 111, such as a capacitor, where electrical charges to maintain a standby condition of the appliance are stored. It should be noted that the initial current for operating the switching device 103 after the standby condition is released is supplied from the charge storing element 111. The current consumed in the switching device 103 at that time is filled up from the main power supply apparatus provided in the main unit 102 via a diode 112.

In this manner, even in the conventional electrical appliance, some effort is paid to save the power consumption. That is to say, an auxiliary power supply is provided separately from the main power supply of the main unit, and the system, such as a remote controlling system, which needs to always be supplied with some electrical power even if the main unit of the appliance is in a standby condition is designed to be driven by the auxiliary power supply in order to save power consumption in the main unit during when the appliance is in a standby condition.

However, even if such an auxiliary power supply is provided, it is still not sufficient to save energy. Because, the apparatus, which should always be operated even when the main unit is in a standby mode, is required to be always in an electrically conductive condition, and thus a significant amount of electrical power is consumed in the apparatus.

The following four electrically conductive conditions are considered for the electrical appliance having a remote controlling function or a signal standby function or for the electrical appliance which is so designed that an electrical power is supplied through an AC adapter.

(1) Complete off condition, which means a plug for connecting the appliance to the commercial AC power source is pulled off:

(2) The plug is still connected to the commercial AC power supply, i.e. inserted into the consent, but the main switch of the appliance is switched off:

(3) The appliance is in a and standby condition for a remote control signal or a telecommunication signal:

(4) The appliance is in a driving condition, which means the main unit is working.

Under the condition (1), there is no problem because no current goes through the appliance: under the condition (2), the appliance having a remote controlling function or the appliance which should always be in a standby condition has no problem because almost no current goes therethrough, but in the appliance using an AC adapter the above mentioned non-load loss is generated; and under the condition (3), the amount of current, which is consumed in the condition for and standby the remote control signal or the telecommunication signal, is not smaller than we expect. Because, the power supply apparatuses for use in electrical appliances are generally constructed such that only the main circuits provided in the secondary side of the transformer are switched off while keeping the circuits in the primary side of the transformer ON during the standby condition, so that some electrical current is always consumed at the primary inductance of the transformer and then so-called copper loss, which is Joule heat of the coil, and so-called iron loss, which is generated by eddy current in the magnetic cores, are generated. In the case, particularly, the power supply apparatus is arranged as a switching regulator, that a switching loss caused by the operation of a switching element is generated in addition to the copper loss and the iron loss.

In the conventional power supply apparatus or the AC adapter used in the electrical appliances, it is not enough to pay efforts to reduce such an electrical power consumption during when the appliance is in the standby condition, but more effort is being paid to decrease the manufacturing cost for the appliances by making the circuit construction simpler. However, nowadays, it should be cared to save energy from a point of view of environment on our earth, then it is becoming an important matter to save the consumption of the electrical power which is wasted when the appliances are in a standby condition.

An electrical power supply apparatus where the above problem is solved has been disclosed, for instance, in Japanese Preliminarily Patent Publication No. HEI 8-130871. The apparatus disclosed in this publication is designed as a DC-DC converter using a switching regulator; when the main unit of the appliance is in a standby mode, a switching element is controlled so as to be operated intermittently in accordance with a and standby signal in order to decrease the electrical current consumption when the main unit is in a standby mode. As stated above, however, the problem of the electrical power consumption during when the main unit is in a standby mode is not only for the DC-DC converter but also for the AC-DC converter which uses a commercial AC supply. If the technique disclosed in the above publication is applied to the AC-DC converter which uses a commercial AC supply, the following problems would be caused.

First of all, a general type of DC-DC converter is generally constructed such that an input voltage of about 24 to 48V is supplied thereinto and an output voltage of about 3 to 15V is taken from the converter. In such a converter, since the difference between the input voltage and the output voltage is small, it is available to use an initiating resister having a small resistance to initiate a control circuit for controlling the operation of the switching element. It means the power loss caused by the existence of initiating resistance is small. Contrary to this, in the AC-DC converter which uses an commercial AC supply, the input voltage is about 100V in Japan, and after rectifying the voltage becomes about 140V. In this case, since only a small amount of voltage of about 10V, which is used for driving the control circuit for controlling the switching element is taken from such a high input voltage, an initiating resister having a large the initiating resistance required to initiate the control circuit. Therefore, in the AC-DC converter, a significant amount of power is consumed by the initiating resistance, so that a sufficient effect for decreasing the power consumption cannot be obtained only by the intermittent operation of the switching element.

Second, in the apparatus disclosed in the abovementioned publication, when the operation of the switching element is conducted intermittently, the switching frequency becomes down to about several kHz so that a discordant sound is generated from the transformer. Therefore, such an apparatus would have a problem if it is applied to the appliances for private demands, such as television equipment, video equipment, etc.

Apparent from the apparatus disclosed in the abovementioned publication, there is a conventional switching regulator using an RCC (Ringing Choke Converter) or in a certain kind of DC-DC converter, where the switching operation of the switching element naturally becomes intermittently when the load thereof becomes extremely small, depending on the design or adjustment of the circuit. In such a converter, the switching frequency comes down to several kHz when the switching operation becomes intermittently, so that a discordant sound is also generated from the transformer. Further, there is another problem that the ripple becomes great when the switching frequency comes down. In order to prevent these problems, in the conventional switching regulator using an RCC, or the conventional DC-DC converter, a bleeder resistance is provided to prevent that the operation of the switching element becomes intermittently. Therefore, in such an apparatus, much more electrical current is consumed by the bleeder resistance in addition to that a certain amount of the electrical power is wasted during when the main unit is in a standby condition.

Furthermore, another type of DC-DC converter is suggested which is so designed that the operation of the switching element is conducted intermittently in accordance with an amount of load. Generally speaking, however, to control the intermittent operation of the switching element is comparatively easy in the DC-DC converter because there is not caused a problem concerning the isolation of a transformer. Contrary to this, a strict isolation is required between the primary side and the secondary side of a transformer in AC-DC converters, and thus it is not easy to control the operation of the switching element freely in AC-DC converters.

SUMMARY OF THE INVENTION

The present invention has for its object to provide a power supply apparatus by which the electrical power consumption can be reduced to the minimum during when the electrical appliances which have a remote control function or the electrical appliance which is arranged to always wait a telecommunication signal etc. is in the standby mode, and thus the waste of energy is restricted to a limit.

In order to carry out the object, the power supply apparatus for talking out DC power from AC power supply according to the first invention comprises a transformer, a switching element for relaying an electrical current supplied into said transformer, and a control circuit for controlling the operation of said switching means, wherein said control circuit is provided at a primary side of the transformer and said control circuit controls the switching means so as that the electrical current is supplied into a primary coil of said transformer intermittently as occasional demands.

The first invention is directed to a so-called switching power regulator for use in an AC-DC converter where the control circuit for controlling the switching operation of the switching element to be intermittent is provided at the primary side of the transformer. The circuit controls the operation of the switching element so as to be intermittent as occasion demands. Therefore, a significant amount of electrical power consumption in the transformer can be saved and a switching loss of the switching element can be decreased.

Further, the apparatus according to the first invention comprises a capacitor between the control circuit and an AC supply, so that the control circuit is driven by an electrical current going through a reactance component of the capacitor. That is to say, in the apparatus, there is provided a capacitor instead of an initializing resistance for initializing the control circuit in order to reduce an energy loss which would be generated if the initializing resistance is provided.

In this manner, according to the invention, there is not provided any resistance for initializing the control circuit for controlling the operation of the switching element; therefore a great amount of the energy loss can be reduced even in the apparatus, such as an AC-DC converter, where the difference between the input voltage and the output voltage to be taken out is large.

Furthermore, it is preferred that the switching operation is conducted intermittently in response to a signal given from the outside, or a load current of the power supply apparatus, or a duty cycle of the switching means, or an oscillating frequency of an oscillator for driving the switching means.

In this case, it is preferred to detect the load current, the duty cycle, or the oscillating frequency by using a comparator, a comparator having a hysteresis characteristic, or a combination of a comparator and a time delay element.

As stated above, by the intermittent operation of the switching element, the switching frequency comes down and then the problem is caused that the discordant sound is generated or the ripple becomes large. However, according to the invention, it is possible to reduce the switching frequency down to a non-audible low frequency (several hundreds Hz or less) by such an arrangement that the load current, etc. is detected by a comparator having a hysterisis characteristic, or a combination of a comparator and a time delay element. Therefore, the appratus according to the present invention can be applied to appliances for personal or individual demands without causing any problem.

Concerning the problem that the ripple becomes large, it can be solved easily by making the capacitor provided at the secondary side of the transformer large or by providing a regulator or a ripple filter after the capacitor.

An electrical supply apparatus according to the second invention is directed to a general type electrical supply apparatus comprises an AC power supply, a transformer, a switching means for switching an electrical current supply line for supplying electrical current to said transformer, a control circuit for controlling an operation of said switching means, wherein said control circuit is provided at a primary side of the transformer and said control circuit controls an operation of said switching means so that the electrical current is supplied into a primary coil of said transformer intermittently, so that the amount of the power consumption during when the appliance is in a standby condition can be largely reduced.

The same as the first invention, it is preferred to provide a capacitor between the control circuit of the switching means and the AC supply, so that the control circuit is initialized by using an electrical current going through a reactance component of the capacitor so as not to generate a significant energy loss, which is generated in the conventional apparatus whenever an initializing resistance is used.

In the second invention, it is also preferred that the change of the operation of the switching means from a continuous manner to an intermittent manner is done in response to a signal given from an outside or, a load current of the power supply apparatus. Further, it is preferred that the load current is detected by using a comparator having a hysterisis characteristic or a combination of a comparator and a time delay element.

It should be noted that the term of the time delay element in the first and second invention includes a time constant circuit or a one shot multi-vibrator circuit, etc.

An electrical power supply apparatus according to the third invention is directed to a power supply apparatus where an alternative current electrical voltage supplied from a commercial AC supply is transformed into a direct current electrical voltage, wherein an input voltage to be supplied to a primary coil of the transformer is supplied in a divided condition in order to reduce the power consumption in the transformer. Here, the divided voltage means not only a voltage obtained from a divided condition such that a part of directly connected capacitors is connected to a primary coil of the transformer in parallel but also a voltage obtained form another divided condition such that at least one capacitor is connected to the primary coil of the transformer in series.

In the power supply apparatus according to the first to the third invention, the detecting means for detecting a signal from the outside, or the detecting means for detecting the load current of the apparatus is provided at the secondary side of the transformer, and the signal detected by the detecting means is transferred to the primary side by using a photo coupler to isolate the primary side and the secondary side of the transformer.

An electrical power supply according to the fourth invention is directed to a power supply apparatus, which comprises an active filter or an inverter, comprises a capacitor between an AC power supply and a control circuit for controlling said active filter or said inverter, wherein the control circuit is initialized by using an electrical current generated in a reactance component of the capacitor. The same as the other inventions, since no initializing resistance is provided, the energy loss there can be saved.

DETAILED EXPLANATION OF THE PREFERRED EMBODIMENTS

Preferred embodiments according to the present invention will be explained below, referring to the attached drawings. It should be noted that the common numerical references are used for the common elements in each embodiment, and the explanation therefor is omitted from the embodiments after the second.

Figure 2:
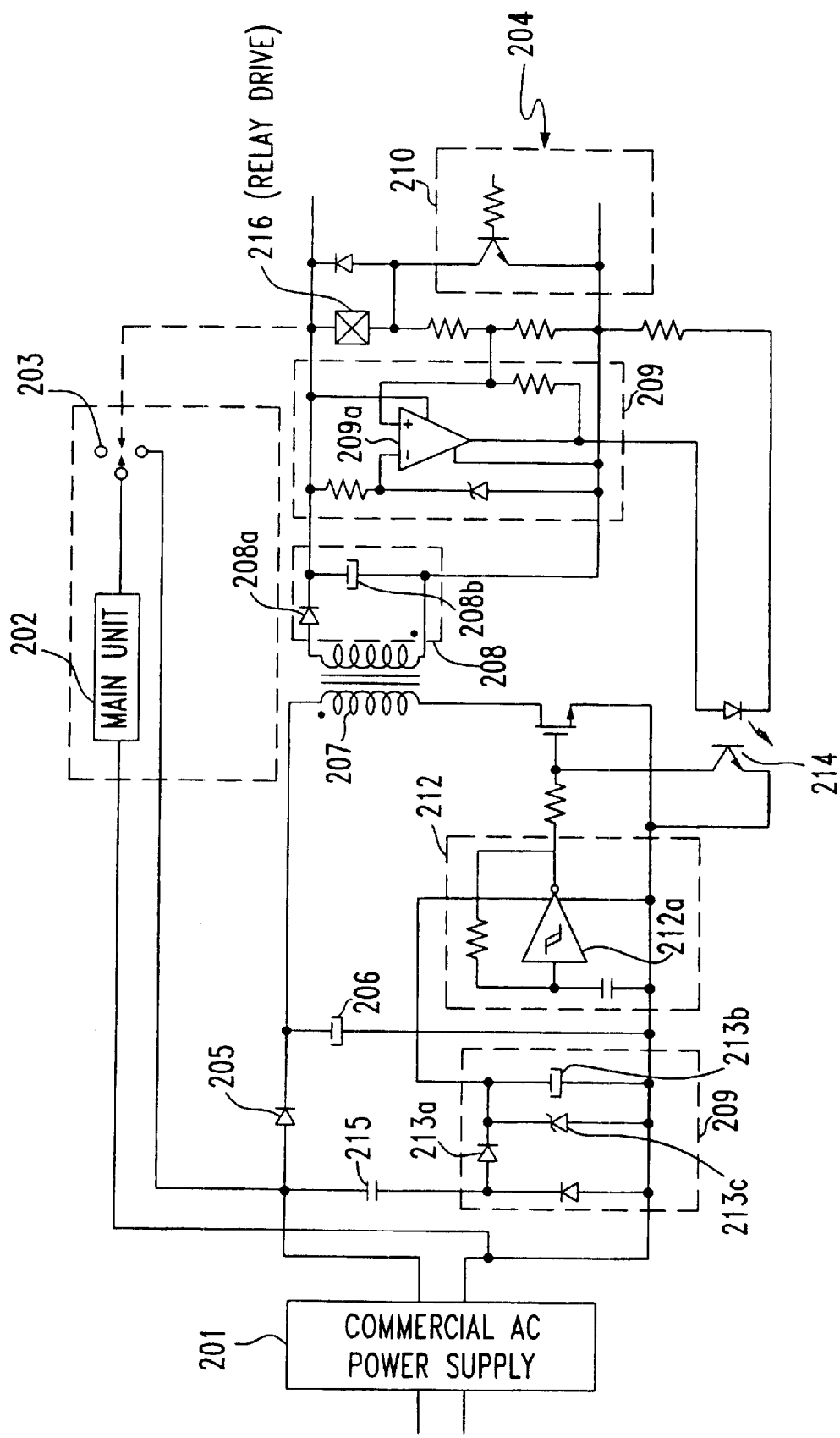
FIG. 2 is a circuit diagram depicting a construction of the first embodiment according to the present invention.

FIG. 2 is a circuit diagram showing a construction of a power supply apparatus according to the first embodiment of the present invention. The apparatus of this embodiment is designed as a switching regulator, and is applied as an auxiliary power supply apparatus of an electrical appliance having a remote control system, which always consumes some electrical power even when the main unit of the appliance is in a standby mode. As shown in FIG. 2, the apparatus is constructed such that only when a switch 203 provided between the main unit 202 and a commercial AC power supply 201 is switched on in response to a signal from a remote control signal receiving circuit 210 which receives a remote control signal 204 from the outside, an electrical current is directly supplied to the main unit 202 from the commercial AC power supply 201. The main unit 202 comprises a main power supply (not shown) for supplying voltage and current for conducting the functions of the main unit 202.

The auxiliary power supply apparatus in the first embodiment comprises a rectifying element 205 for rectifying an alternating current supplied from the commercial AC power supply 201, a capacitor 206 for storing the thus rectified current, a transformer 207, a rectifying and smoothing circuit 208 for rectifying and smoothing an output of the transformer 207, a load current detecting circuit 209 for detecting a load current of the auxiliary power supply apparatus itself, a remote control signal receiving circuit 210 for receiving a remote control signal coming from the outside, a switching element 211 for intermitting the current supply to the transformer 207, an oscillator circuit 212 for operating the switching element 211, a control power supply 213 for controlling the oscillator circuit 212, and a photo coupler 214 for performing a gate operation for the oscillator circuit 212 in response to an output of the load current detecting means 209.

The electrical current supplied from the commercial AC power supply 201 is stored in the capacitor 206 after being rectified by the diode 205, and then supplied to a primary coil of the transformer 207 via the switching element 211, while, the electrical current from the AC power supply 201 is supplied to the control power supply 213 for controlling the oscillator circuit 212. In this apparatus, is provided a capacitor 215 between the control power supply 213 and the commercial AC power supply 201 instead of a initializing resistance, which is generally arranged to initialize the control power supply 213, then the oscillator circuit 212 is driven by using an electrical current going through a reactance component of the capacitor 215. According to such an arrangement, it is possible to reduce an energy loss which would be caused by a heat generated in the initializing resistance, if the resistance is provided in the switching power supply apparatus. A capacitor having its capacitance of about 0.01 $\mu$F can be preferably used for the capacitor 215. According to the construction, the little amount of current which passes through the capacitance reactance is stored in a capacitor 213b via a diode 213a to perform a control power supply function for driving the oscillator circuit 212. In this embodiment, a Zener diode 213c is provided in parallel to the capacitor 213b so that no excess voltage is generated here. The oscillator 212a using a Schmitt trigger inverter is operated by an electrical power supplied from the AC power supply 213 to drive a MOSFET 211 which is provided as a switching element of the switching regulator.

On the other hand, the electrical current from the commercial AC power supply 201 is rectified by the diode 205 and smoothed by the capacitor 206; then it is switched by the MOSFET 211 to generate a pulse current; the thus generated pulse current is sent to the transformer 207 to be supplied to the secondary side thereof. The electrical current supplied to the secondary side, is stored in an electrical charge storing device, such as a capacitor 208b. In the capacitor 208b, is stored energy which is required to drive a relay drive circuit 216 for driving the switch 203. By making the switch 203 ON, the current starts to be supplied into the main unit 202 continuously.

In the downstream of the capacitor 208b, is provided a load current detecting circuit 209 for detecting a load current of the auxiliary power supply apparatus. In this embodiment, the load current detecting circuit 209 comprises a Schmitt trigger circuit 209a and an output thereof is given to the photo coupler 214. When an input voltage of the plus terminal of the Schmitt trigger circuit 209a becomes higher than a given threshold voltage, the photo coupler 214 is lit and then the pulse signal is stopped to be supplied from the oscillator 212a to the MOSFET 211. When the switching operation of MOSFET 211 is stopped no electrical current is supplied to the transformer 207. Then, the input voltage of the Schmitt trigger circuit 209a becomes lower than the threshold voltage, and thus the photo coupler 214 is lit off, so that the oscillator circuit 212 starts to supply pulse signals to the MOSFET 211 again. Since such a feedback loop is formed, the output voltage of the auxiliary power supply apparatus is always managed so as not to exceed a predetermined range. Therefore, the current supply to the transformer 207 is conducted intermittently in accordance with the management of the output voltage of the apparatus, so that the electrical current consumption there can be significantly reduced.

In this embodiment, the output voltage of the auxiliary power supply apparatus is controlled by a comparator having a hysterisis characteristic, however, a combination of a comparator and a one shot multi-vibrator or a comination of a comparator and a time constant circuit can be used therefor. Such combinations, it becomes to be apt not to be influenced by a discordant noise which is generated in the transformer at the vicinity of the threshold voltage. Further, in this embodiment, the coil type transformer is used, but the present invention can also be applied to a piezoelectrical type transformer. In general type of switching regulators, the switching frequency of the switching element 211 is over 10 kHz, however, according to the invention, intermittent electrical current supply is supplied to the transformer with a slow interval, i.e. several hundreds Hz or less.

In the first embodiment, the invention is applied to an auxiliary power supply apparatus for driving a remote control system, however, it is possible to apply the invention to a power supply apparatus which is commonly used for supplying power to the remote control system and to the main unit of the appliance. In this case, when the main unit 202 of the appliance is in a driving mode, the load of the power supply apparatus is always high so that the switching operation of the switching element 211 should be done continuously during the driving mode. While, when the main unit 202 is in a standby mode in response to the remote control signal received by the remote controller 210, the switching element is operated intermittently.

Figure 3:
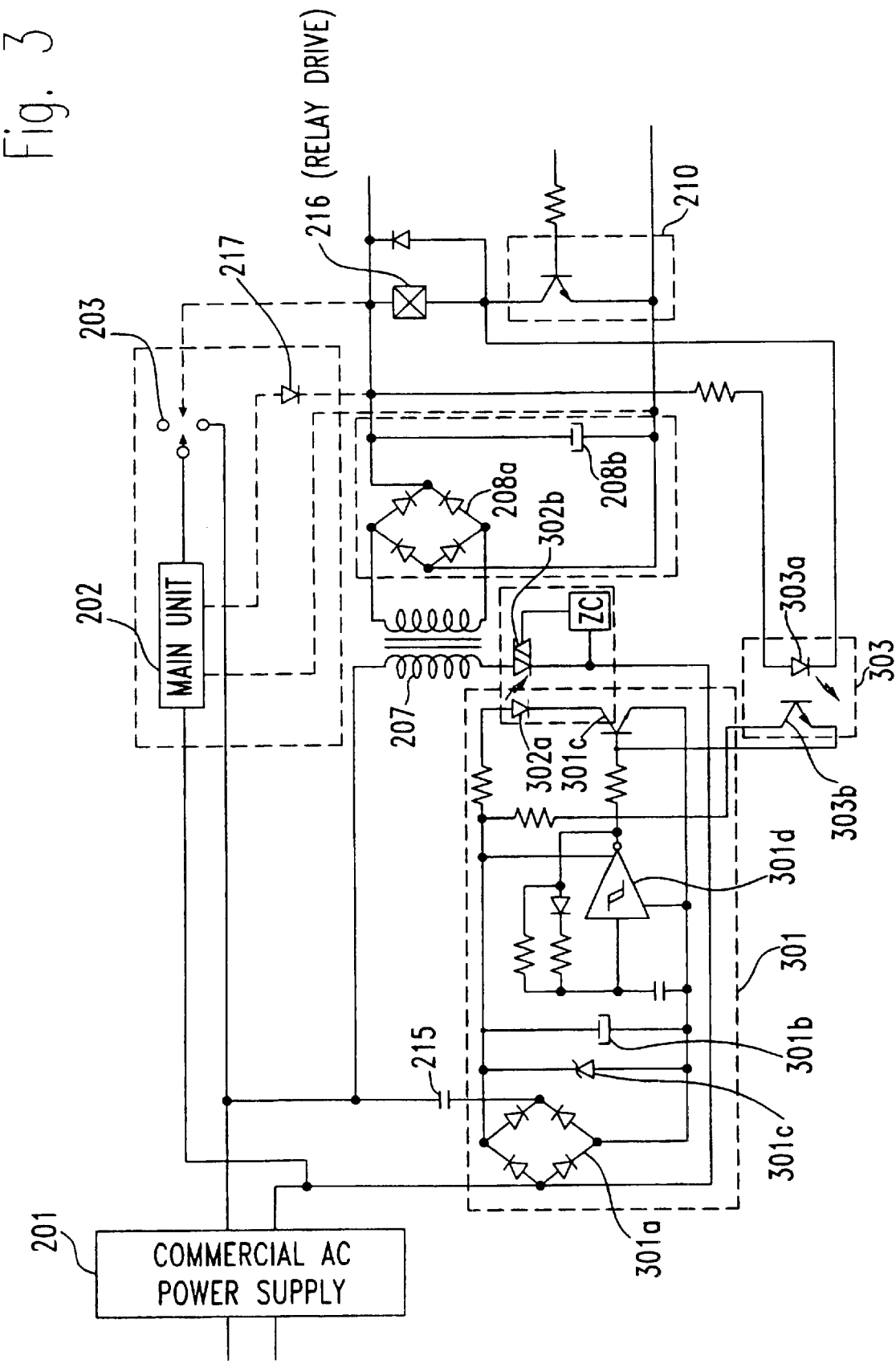
FIG. 3 is a circuit diagram illustrating a construction of the second embodiment according to the present invention.

FIG. 3 is a circuit diagram depicting a construction of the second embodiment of the power supply apparatus according to the present invention. In the second embodiment, the present invention is applied not to a switching regulator but to a general type of power supply apparatus which is used being connected to a commercial AC power supply. The same as the first embodiment shown in FIG. 2, the apparatus is designed as an auxiliary power supply apparatus for driving a remote control system.

In the second embodiment, a switching device (a photo coupler) 302 is provided on an electrical current supply line from a commercial AC power supply 201 to the primary coil of the transformer 207; the switching device 302 is arranged so as to be operated intermittently in response to a load current of the auxiliary power supply apparatus, so that the amount of current supply to the primary coil of the transformer 207 can be reduced.

The electrical current supplied from the commercial alternative AC power supply 201 is sent to the transformer 207, while, supplied to a control circuit 301 for controlling the switching operation of the photo coupler 302. The same as the first embodiment, there is provided a capacitor 215 between the control circuit 301 and the commercial AC power supply 201, so that the control circuit 301 is operated by an electrical current going through a reactance component of the capacitor 215. Therefore, no energy loss is caused there because no initiating resistance is provided.

The electrical current supplied to the control circuit 301 via the capacitor 215 is rectified by a full wave rectifying diode 301a and then stored in a capacitor 301b. A Zener diode 301c is provided in parallel to the capacitor 301b for the purpose to avoid an excessive voltage. In the downstream of the capacitor 301b, is provided a pulse generator 301d using a Shumitt trigger inverter whose output is supplied to the photo coupler 302. The photo coupler 302 is composed of an LED 302a and a bipolar thyristor 302b; the LED 302a is provided on the control circuit 301 side and the bipolar thyristor 302b on the current supply line to the transformer 207. The photo coupler 302 is lit on in response to an output of the pulse generator 301d to switch the bipolar thyristor 302b. The LED 302a is set up in such a manner that the light-on time (about 0.04 second) is by far shorter than the light off time (about one second), so that the light-on period of the bipolar thyristor 302b becomes short. The reason for the settlement is that it is not necessary to supply an electrical current to the auxiliary power supply continuously because only a little power is consumed there during when the main electrical appliance is on a standby mode. By such an arrangement that the conductive time of the thyristor is by far shorter than the non-conductive time thereof in order to supply the current to the transformer by magnetizing the current intermittently, the power consumption in the transformer there can be reduced by a large margin. When the photo coupler 302 is made conductive, the electrical current is continuously supplied to the secondary side of the transformer 207 and then stored in the capacitor 208b via a rectifying circuit 208a. The stored power is consumed when a relay drive 216 is driven as occasion demands.

Between an output line of the secondary side of the transformer 207 and the control circuit 301, is provided a second photo coupler 303. An LED 303a of the photo coupler 303 is lit on when the relay drive 216 is driven and thus the load current of the secondary side of the transformer becomes large. In response to the conductive condition of the LED 303a, a transistor 303b of the photo coupler 303 is conducted so that the LED 302a of the first photo coupler 302 is kept to be lit on and thus the bipolar thyristor 302b is made short to continuously supply the current to the transformer 207. A zero-cross switch 302c is attached to the bipolar thyristor 302b in order to reduce spike noise.

Figure 1:
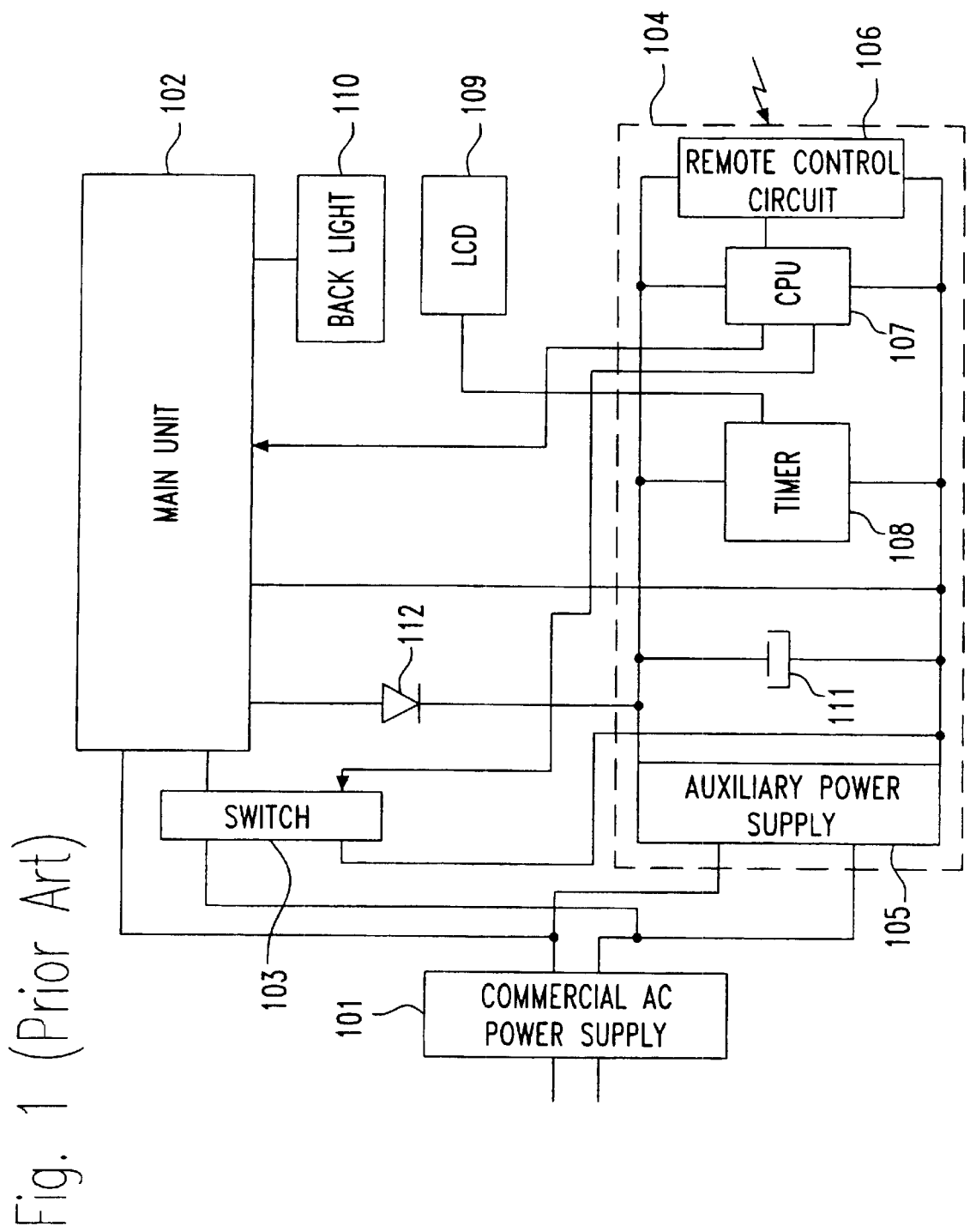
FIG. 1 is a block diagram showing a construction of the conventional power supply apparatus.

As stated about the general power supply apparatus shown in FIG. 1, if the auxiliary power supply is connected to the main unit 202 of the electrical appliance via the diode 217 (shown by a broken line in FIG. 3), when the switch 203 is made on in response to the output of the relay drive 216 and the electrical current starts to be supplied from the commercial AC power supply 201 to the main unit 202 directly, the electrical current for driving the relay drive 216 is supplied from the main unit 202 to the capacitor 208b through the diode 217. In this case, therefore, the photo coupler 303 is not necessary and thus the electrical current is always intermittently supplied to the transformer 207.

It should be noted that the present invention can be applied not only to the auxiliary power supply for driving the remote control system, etc., but also to the power supply which is commonly used to drive both the remote control system and the main unit of the appliance.

Figure 4:
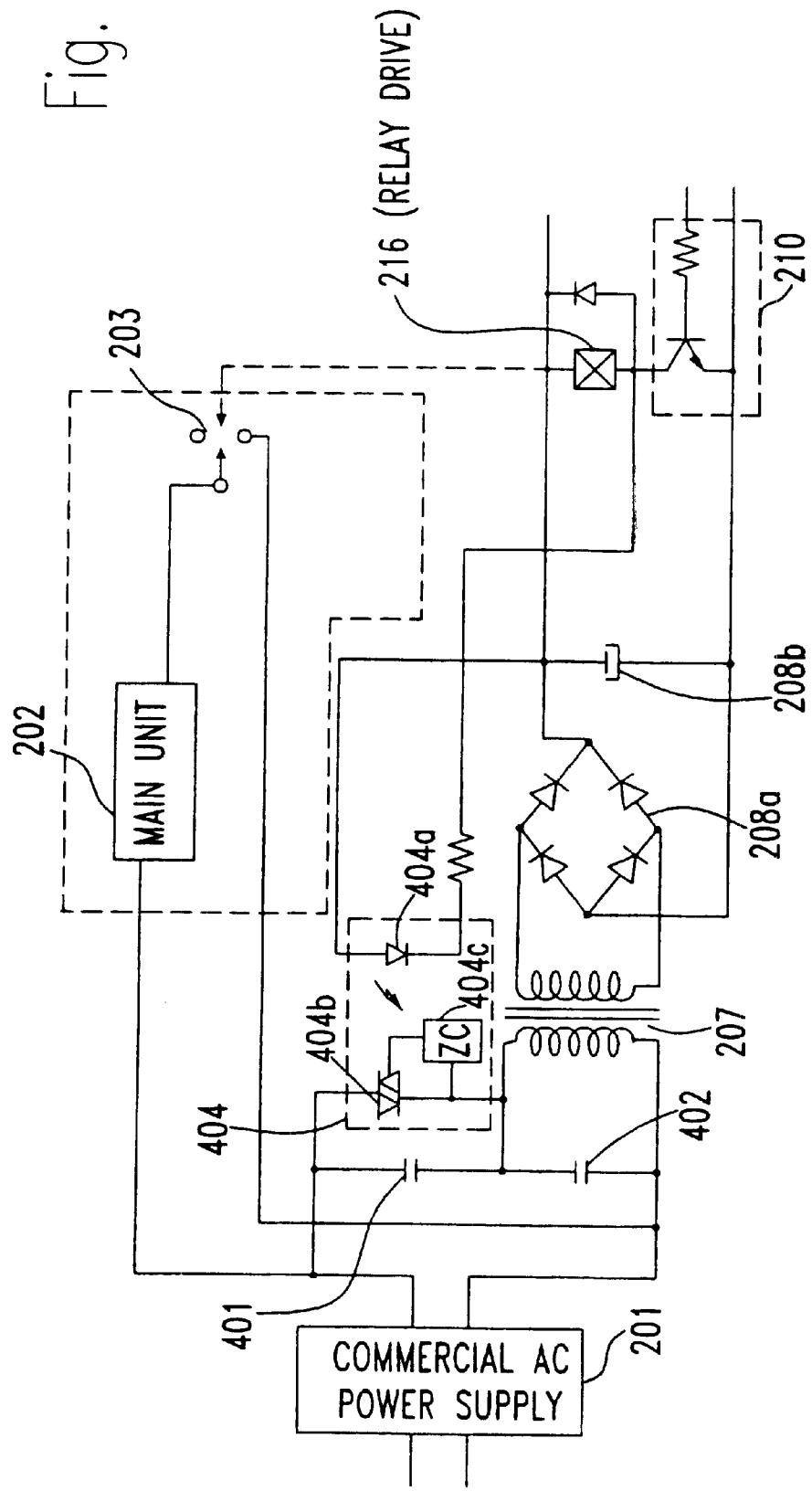
FIG. 4 is a circuit diagram representing a construction of the third embodiment according to the present invention.

FIG. 4 is a circuit diagram illustrating a construction of the third embodiment according to the present invention. In the third embodiment, the invention is applied to a power supply apparatus using a small size commercial transformer. The power supply apparatus in this embodiment is also used for driving a remote controller. In the third embodiment, an input voltage of the transformer 207 is divided so as to reduce the power consumption. Since the smaller the transformer, the worse the transforming effect, if an electrical current is always supplied to the primary coil of the transformer, a significant amount of power must be wasted. In the third embodiment, capacitors 401 and 402, which are connected in series, are provided between the commercial AC power supply 201 and the primary coil of the transformer 207 to divide the input voltage for the transformer 207 in order to reduce the energy loss there. In this embodiment, only one of the connected capacitors in series is connected to the primary coil of the transformer in parallel to obtain a voltage divided condition. However, such a voltage divided condition can also be obtained by such an arrangement that only one capacitor is connected to the primary coil of the transformer 207 in series.

A photo coupler 404 is provided between the primary side and the secondary side of the transformer 207 so as to be able to remove the divided voltage condition by using the photo coupler 404. That is to say, an LED 404a is provided between one of the output lines of the secondary coil of the transformer 207 and an output terminal of the remote control signal receiving circuit 210, while a bipolar thyristor 404b is connected to the capacitor 401 in parallel, to compose a photo coupler 404; when the output of the remote control signal receiving circuit 210 is OFF, in other words, the appliance is in a standby condition, the LED 404a is not lit and then the input voltage of the transformer 207 is divided to reduce the power consumption there, while the output of the remote control signal receiving circuit 210 becomes ON in response to a signal given from the outside, in other words, the appliance is in a driving mode, the LED 404a is lit to make the bipolar thyrister 404b short and to remove the divided voltage condition of the transformer 207. Once the divided voltage condition is removed, the more electrical current is supplied to the secondary coil, and the energy generated there is consumed to operate the remote control receiving circuit 210 and the relay drive 216.

According to such an arrangement that an inductive impedance, i.e. a transformer, is driven after the input voltage is divided by the capacitor, a kind of impedance matching circuit is realized. Therefore, in case the power supply apparatus according to the third embodiment is applied as an auxiliary power supply in the appliance which is necessary to be driven even when the appliance is in a standby mode, the same transformer can be used for the other commercial AC power supplies having a different voltage supply by only changing a circuit constant. In the auxiliary power supply apparatus which is exclusively used for the apparatus which should always wait signals, it is possible to take a sufficient voltage from the secondary side of the transformer to drive the remote control circuit, etc. even the input voltage is divided, because the load of the auxiliary power supply apparatus is not so great.

Figure 5:
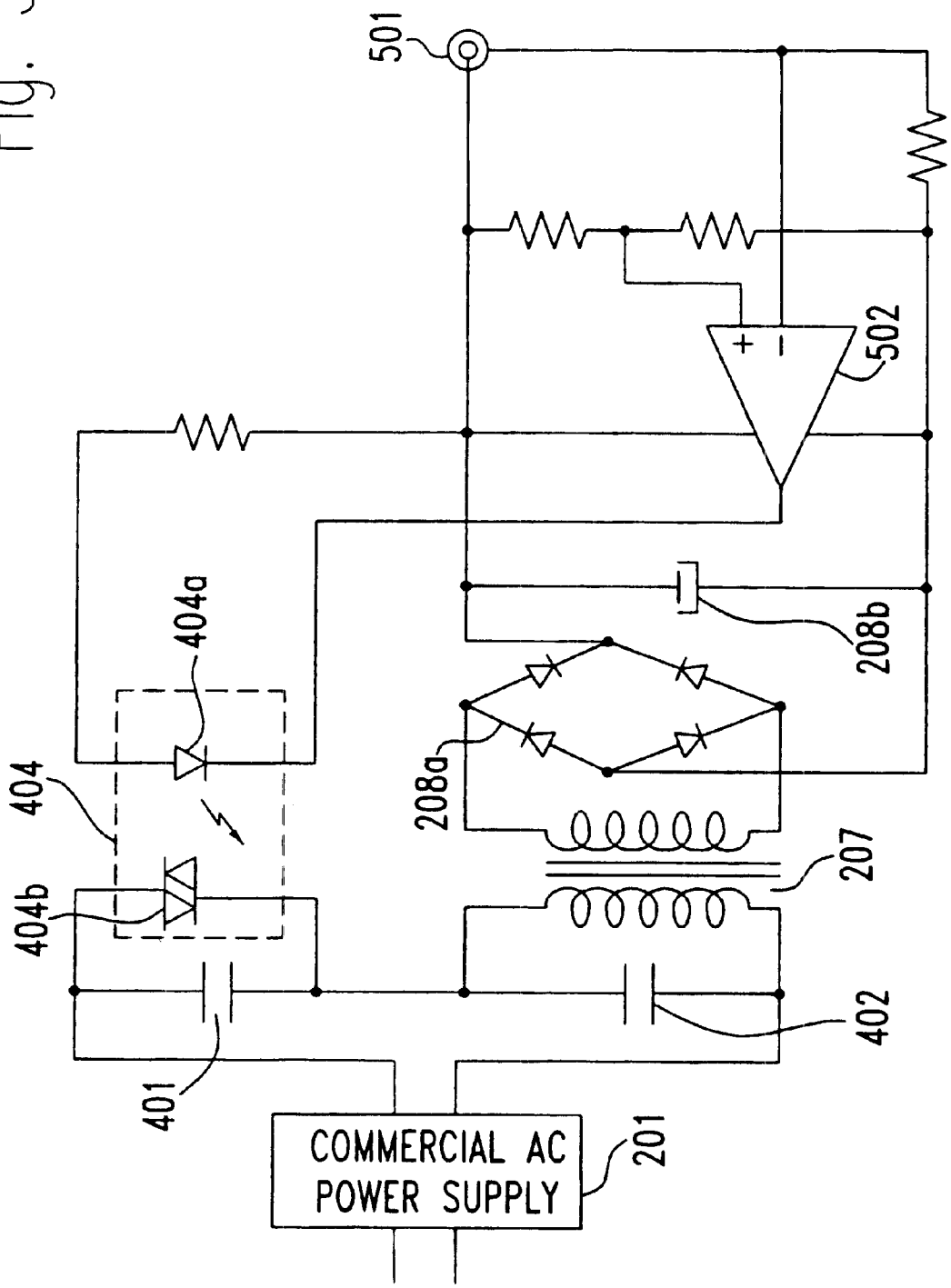
FIG. 5 is a circuit diagram showing a construction of the fourth embodiment according to the present invention.

FIG. 5 is a circuit diagram representing a power supply apparatus according to the fourth embodiment of the present invention. In the fourth embodiment, the invention is applied to a power supply apparatus using an AC adapter where information for switching the operation mode of the appliance between a standby mode and a driving mode is obtained not from an outside but from a load current of the power supply apparatus.

As the same to the third embodiment, the voltage from the commercial AC power supply 201 is divided by the capacitors 401 and 402 and the transformer 207 is driven by the divided voltage. On the secondary side of the transformer 207, are provided a full wave rectifying circuit 208a and a capacitor 208b for storing the electric current; and a direct current output terminal 501 is connected to the main unit of the electrical appliance (not shown). In the fourth embodiment, a comparator 502 is used to detect a load current. Further, as the same to the third embodiment, the bipolar thyrister 404b is connected to one of the capacitors in parallel to divide the input voltage, while an LED 404a is provided on an output line of the comparator 502 to constitute a photo coupler 404; the photo coupler 404 is driven in accordance with the output of the comparator 502 to change the divided condition of the input voltage of the transformer 207. That is to say, when the electrical appliance is not driven (in a standby mode), almost no electrical current is supplied to the power supply. Thus, the comparative input voltage at the minus terminal of the comparator 502 goes down and then the LED 404a of the photo coupler 404 is not lit and then the input voltage of the transformer becomes to a divided condition. On the other hand, when the appliance is driven (in a driving mode), a necessary current for driving the appliance is supplied via the output terminal 501, and the comparative input voltage of the comparator 502 is reversed to light the LED 404a and then the thyrister 404b is made short to remove the divided condition of the input voltage of the transformer 207.

In the fourth embodiment, the load current is detected by the comparator 502, however if the current going through the secondary side of the transformer is enough to light the LED 404a of the photo coupler 404 on, it may be possible to omit the comparator 502 and to connect the LED 404a to the output terminal 502 directly.

Figure 6:
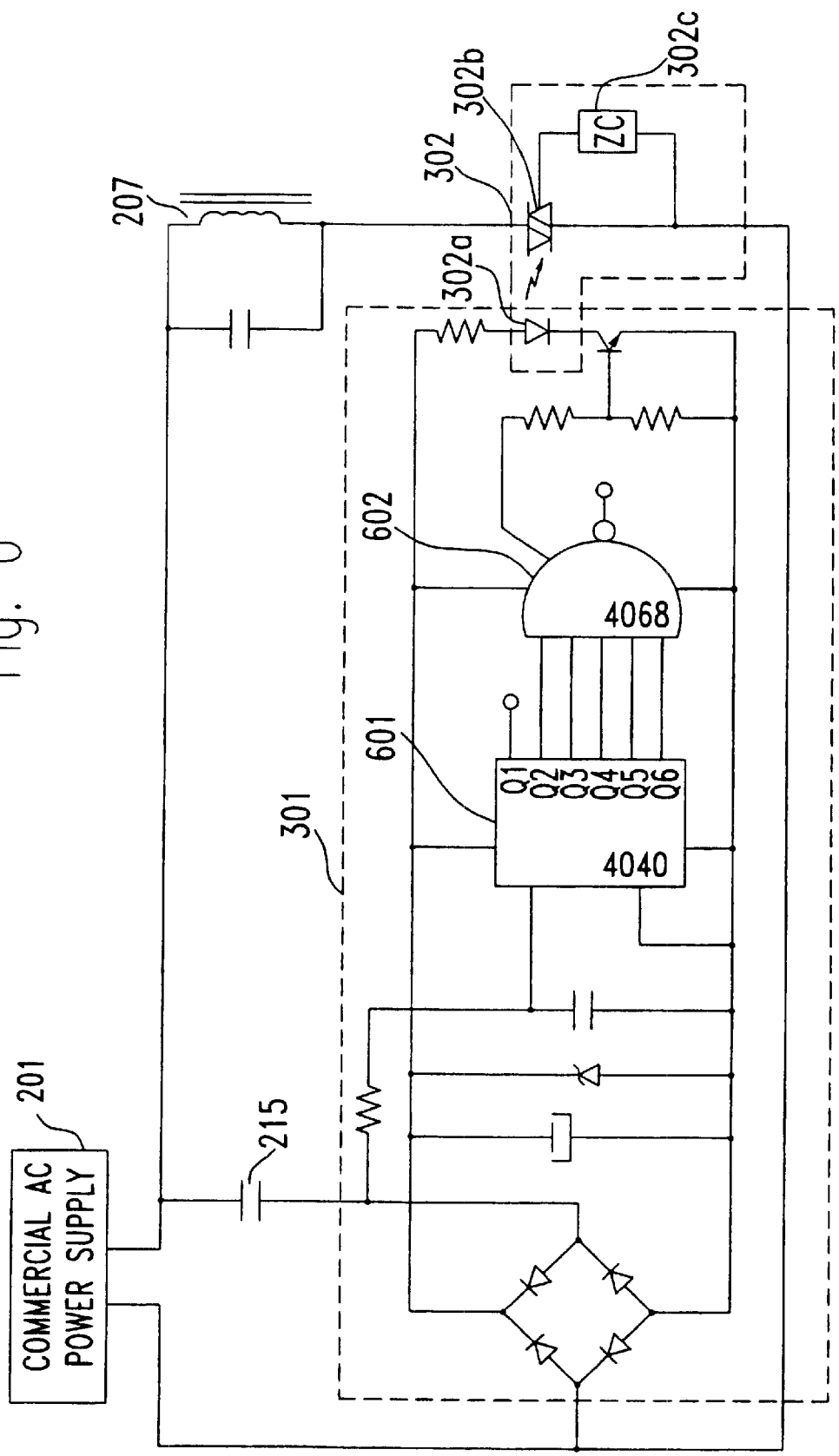
FIG. 6 is a circuit diagram depicting a construction of the fifth embodiment according to the present invention.

FIG. 6 is a circuit diagram showing a construction of the power supply according to the fifth embodiment of the present invention. In the fifth embodiment, the invention is applied to a power supply apparatus which is commonly used to drive a device, for instance, a remote controller, which always consumes some electrical power even if the main unit is in a standby mode, and used to drive the main unit of the appliance. In such a case that the power supply apparatus is commonly used to the remote controller and the main unit of the appliance, it is necessary to use a large transformer because a great amount of power is consumed to drive the main unit of the appliance. Because, the larger the capacitance of the power supply transformer, the easier the entry current goes through, so the magnetic core is apt to be easily saturated.

In the fifth embodiment, as the same to the second embodiment shown in FIG. 3, a photo coupler 302 is provided between the control circuit 301 and the electrical current supply line to the primary side of the transformer 207, so that the electrical current is intermittently supplied to the transformer 207. It should be noted that the circuit on the secondary side of the transformer 207 is omitted in FIG. 6.

However, in the transformer having a large capacitance, the direction of a remanence is determined by a timing when the power supply apparatus is switched off. Therefore, the amount of the next entry current becomes completely different depending on the situation that the electrical conduction starts after the direction of the remanece has been returned or the conduction starts keeping the direction of the remanence as it was. Therefore, in the fifth embodiment, the timing to switch on or off to supply the electrical current to the transformer 207, in other words, the on/off operation of the photo coupler 302 is managed so as to be synchronized to the frequency of the commercial AC power supply 201, so that the direction of the remanence of the transformer 207 is kept to be the same to the direction of the entry current. According to such an arrangement, it is possible to reduce the amount of the entry current when the electrical current starts to be supplied to the transformer 207 during when the current is supplied intermittently to the transformer 207.

More concretely, in the fifth embodiment, a binary counter 601 and an AND gate 602 are provided instead of the Schmitt trigger inverter circuit 301d, which has already been explained above for the second embodiment. The frequency of the voltage supplied from the commercial AC power supply 201 is divided by the binary counter 601, and an AND output is obtained through the AND gate 602; so that the photo coupler 302 is operated during only the period corresponding to the two waves out of the 64 waves divided by the binary counter 601. Therefore, the transformer 207 is made conductive with a regular timing which is synchronized with the frequency of the commercial AC power supply 201.

In the fifth embodiment, the on/off timing of the bipolar thyrister 302b of the photo coupler 302 is synchronized to the frequency of the commercial AC power supply 201 by using the binary counter 601 and the AND gate 602. However, it is possible to obtain the same effect without using the binary counter, but by attaching, for instance, a zero cross switch having a directivity, i.e. a zero cross switch which selectively operates at only one direction of the zero crossings, to the bipolar thyrister.

Figure 7:
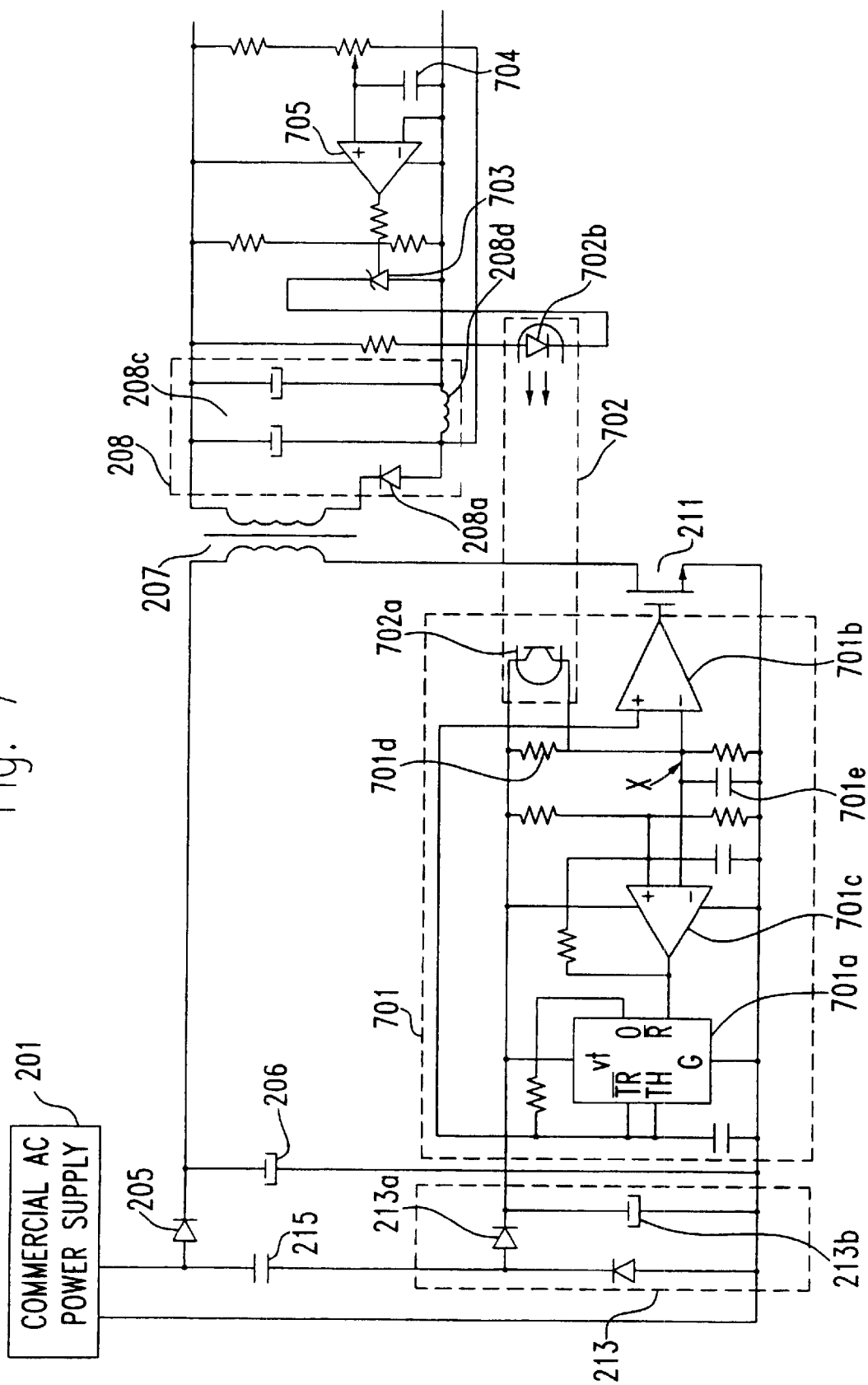
FIG. 7 is a circuit diagram illustrating a construction of the sixth embodiment according to the present invention.

FIG. 7 is a circuit diagram depicting a construction of the power supply apparatus according to the sixth embodiment of the present invention. The invention is applied to a switching regulator in this embodiment. When the load current of the power supply apparatus is 20 to 100% of the peak current, the switching element 211 is continuously driven to supply electrical current to the transformer 207, while, when the load current is 20% or less of the peak current, the switching element 211 operates intermittently, so that it can be prevented that an unnecessary power is consumed when the load of the apparatus is small, for instance, when the main unit is in a standby mode. In the sixth embodiment, a duty cycle of the switching element 211 is detected, and the operation of the switching element 211 is controlled in accordance with the detected duty cycle in order to reduce an energy loss as explained below.

As depicted in FIG. 7, there is provided a controlling circuit 701 for controlling the switching element 211 which is arranged on the electrical current supply line from the commercial AC power supply 201 to the transformer 207. The output of the power supply 201 is supplied to the transformer 207, while supplied to an auxiliary power supply 213 for driving the control circuit 701 via a capacitor 215. The control circuit 701 comprises an oscillator 701$a$ and first and second comparators 701$b$ and 701$c$. The oscillator 701$a$ generates puseudotriangle waves; and the triangle wave is supplied to a plus terminal of the first comparator 701$b$. To the minus terminal of the first comparator 701$b$, is supplied a voltage generated at both ends of the capacitor 213$b$ in a voltage divided manner. the voltage is compared to the output of the oscillator 701$a$ to drive the switching element 211. According to the construction, the apparatus is set up such that when the photo coupler 702, which will be explained below, is switched off and then the transistor 702$a$ is not made conductive, the duty cycle of the switching element 211 becomes 50%, while when the photo coupler 702 is switched on and the transistor 702$a$ is conducted, the duty cycle becomes 0%.

On the other hand, there is provided a rectifying smoothing circuit 208 composed of a diode 208$a$ and a pi ($\pi$) type filter 208$c$ on the secondary side of the transformer 207. On the downstream of the filter 208$c$, is arranged a standard voltage element 703 in parallel to the filter 208$c$, and an LED 702$b$ is provided on the output line of the standard voltage element 703. The LED 702$b$ and the transistor 702$a$ constitute a photo coupler 702; the LED 702$b$ is arranged to be parallel to the resistance 701$d$ and the transistor 702$a$ is used for dividing an input voltage to the first comparator 701$b$ on the primary side of the transformer 207.

When the switching element 211 operates in response to the oscillator 701$a$ to supply a pulse current to the transformer 207, the output of the secondary side of the transformer 207 is given to the standard voltage element 703. When the output is higher than the standard voltage of the element 703, a great amount of current goes through the element 703 to make the LED 702$b$ of the photo coupler 702 bright, so that the current going through the transistor 702$a$ is increased to make the potential at a point X high. The potential at the minus terminal of the first comparator 701$b$ thereby becomes high, then the duty cycle of the first comparator 701$b$ decreases. Therefore, the interval for the condition ON of the switching element 211 becomes short so that the amount of current supplied to the transformer 207 becomes small. As a result, the voltage at the secondary side of the transformer 207 decreases so that the standard voltage element 703 becomes non-conductive. In this manner, a control loop is formed that the photo coupler 702 becomes dark, the potential at the point X decreases, and then the duty cycle of the first comparator 701$b$ increases.

While, to the minus terminal of the second comparator 701$c$, is given the voltage at the point X, and to the plus terminal thereof, is provided a voltage at the time when the duty cycle of the first comparator 701$b$ decreases to 10% or less as a standard voltage. Therefore, when the potential at the point X increases to make the duty cycle of the first comparator 701$b$ down to 10% or less, the second comparator 701$c$ starts to output a signal. The output terminal of the second comparator 701$c$ is connected to a reset terminal of the oscillator 701$a$; the oscillator 701$a$ stops to generate the triangle wave in response to the output of the second comparator 701$c$. After stopped to generate the triangle wave, the electrical current consumption at the secondary side of the transformer 207 increases little by little and the output voltage of the secondary side of the transformer 207 becomes smaller than a predetermined value; then the LED 702$b$ of the photo coupler 702 becomes dark and the amount of the current going through the transistor 702$a$ becomes small. Therefore, the voltage at the minus terminal of the second comparator 701$c$ goes down to make the output of the comparator 701$c$ high, so that the reset condition of the oscillator 701$a$ is released and then the oscillator 701$a$ starts to generate the triangle wave again. The intermittent switching operation of the switching element 211 is conducted by repeating the above-mentioned operation. In the sixth embodiment, the duty cycle of the first comparator 701$b$, in other words, the duty cycle of the switching element 211, is detected in this manner; when the duty cycle becomes lesser than a predetermined value, the generation of the triangle wave signal by the oscillator 701$a$ is stopped. During the period when the generation of the triangle wave signal is stopped, the switching operation of the element 211 is not conducted and thus the energy loss caused by unnecessary switching operation can be reduced.

It should be noted that a positive feedback is applied to the second comparator 701$c$ in order to make the frequency of the swithcing operation low when the switching operation is conducted intermittently. Further, a capacitor 701$e$ provided between the point X and the ground works for the same purpose.

In the sixth embodiment, to stop the oscillation in the oscillator 701$a$, in other words, to switch the condition that the power is supplied to the transformer 207 continuously or intermittently, is not conducted by the load detected at the secondary side of the transformer 207, but conductive automatically in responding to the duty cycle of the switching element 211. Such a condition can be substantially achieved only by adding the second comparator 701$c$. It means the energy loss caused by the switching operation of the switching element 211 during the standby mode can be reduced with a simple circuit construction.

In order to judge the timing when the operation of the switching means should be changed by detecting the electrical current consumption in the power supply apparatus, it is necessary to provide a resistance for detecting the change of the current, and some energy is lost at the resistance. Further, in order to judge the timing by using a hysterisis voltage, some ripple would be generated. Furthermore, if providing a ripple filter in order to remove the ripple, some energy would be lost at the ripple filter. Contrary to those, in the sixth embodiment of the present invention, a "dead zone" is provided in the duty cycle of the first comparator 701$b$ and the current supply is stopped when the duty cycle becomes into the "dead zone". Therefore, it is unnecessary to provide a resistance for detecting the consumed current or to set any ripple filter for removing the ripple. Therefore, the energy loss generated by them can be totally prevented.

In the sixth embodiment, it is arranged such that the switching frequency of the switching element 211 is fixed but only the duty cycle thereof is varied (both the on time and off time are varied). However, the other circuit constructions may be taken such that the on time of the switching element is fixed but the switching frequency and the off time of the switching element are varied, or that the off time of the switching element is fixed, but the switching frequency and the on time of the switching element are varied. In any case, it can be considered that the duty cycle is varied in equivalent. Therefore, the term of duty cycle here is used in an equivalent meaning and thus includes all situations mentioned above.

Furthermore, in the sixth embodiment, the invention is applied to a flyback type power supply apparatus which has only one switching element, but in the power supply apparatus which has a plurality of switching elements, or in a resonant type power supply apparatus or in a partial resonant type power supply apparatus, it is difficult to signify the duty cycle of the switching element apparently. However, from the point of view of energy, it is possible to take the duty cycle of the switching element(s) in all kinds of the power supply apparatuses into consideration. Therefore, the present invention can be applied not only to the apparatus which has one switching element but also to all of the other types of the apparatuses mentioned above.

In the apparatus according to the sixth embodiment, the power consumption is further reduced by the construction that the current consumption at the secondary side of the transformer 207 is detected and the output voltage at the secondary side of the transformer is limited when the amount of the detected electrical current is small. That is to say, an output of the inductor 208d of the pi (π) type filter 208c is supplied to an additional comparator 705; the gate of the standard voltage element 703 is driven by the output of the comparator 705 to change the divided voltage ratio with respect to the standard voltage element 703. In other words, when the amount of the current consumption at the secondary side is small, the divided voltage ratio to the standard voltage element 703 is so changed that the output voltage of the secondary side is limited to be under a predetermined voltage and thus the power consumption in the power supply apparatus is further reduced. In order to detect an electrical current, a resistance is generally used. However, in this embodiment, a direct current resistance component of the inductor 208d of the pi (π) type filter 208c is used to detect the current consumed at the secondary side. Therefore, the current consumption can be reduced more in comparison to the case that a resistance is used to detect the current. It should be noted that the high frequency component contained in the inductor 208d is cut off by a low pass filter 704.

Figure 8:
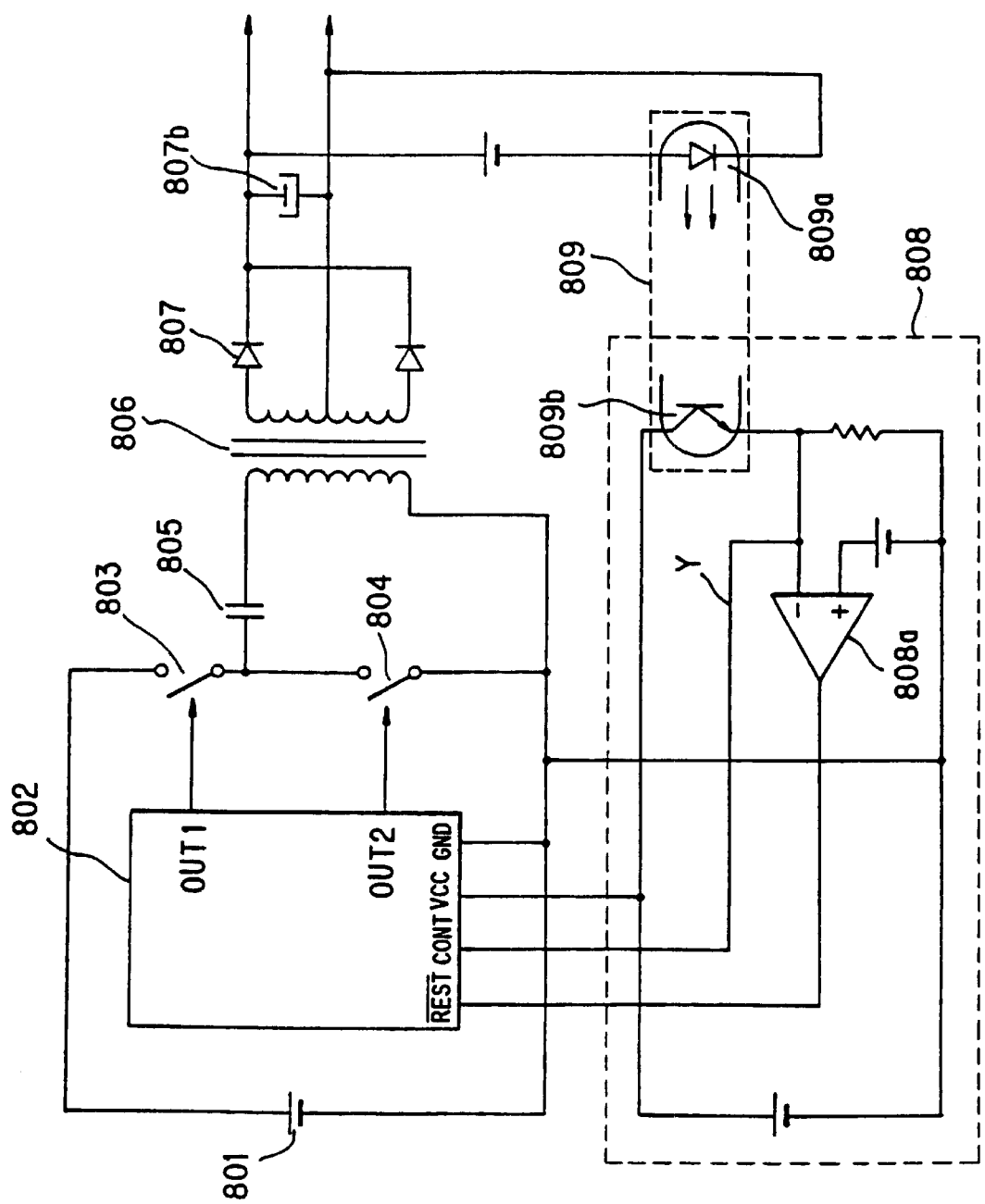
FIG. 8 is a circuit diagram representing a construction of the seventh embodiment according to the present invention.

FIG. 8 is a circuit diagram illustrating a construction of the power supply apparatus according to the seventh embodiment of the present invention. In the seventh embodiment, the present invention is applied as a resonant type converter. The apparatus comprises a direct current electrical power supply 801 (it can be alternated by a rectified power obtained from a commercial AC power supply), an oscillating circuit (Voltage-Controlled Oscillator) 802, switching elements 803 and 804, a transformer 806, a capacitor 805 which constitutes an LC resonate circuit with an inductance of the primary side of the transformer 806. The apparatus further comprises a rectifying circuit 807a, a capacitor 807b for making the output rectified by the circuit 807a smooth at the secondary side of the transformer 806. There is provided a photo coupler 809 constituted by a light emitting diode 809a and a transistor 809b between the control circuit 808 for controlling the oscillator circuit 802 and the output terminal of the secondary side of the transformer 806.

Figure 9:
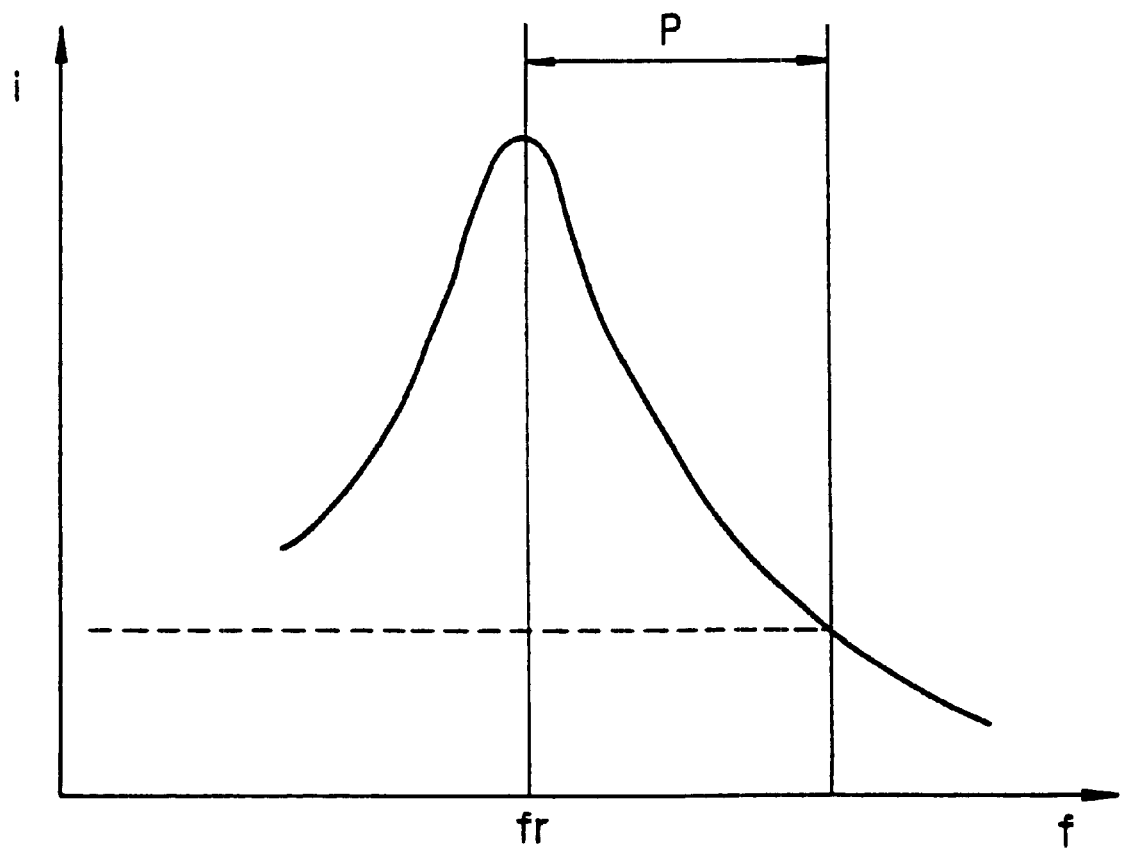
FIG. 9 is a graph showing a characteristic of a resonance current going through the apparatus of the seventh embodiment.

The output of the direct current power supply 801 (or a rectified power obtained from a commercial AC power supply) is switched by the switching elements 803 and 804, which are alternatively operated in response to the outputs of the output terminals OUT 1 and OUT 2 of the oscillating circuit 802, and resonated by the resonating circuit constituted of the capacitor 805 and the primary side inductance of the transformer 806. The relationship between the resonating frequency (f) and the resonating current (i) is shown in FIG. 9. As shown in FIG. 9, the amount of the electrical current going through the transformer 806 becomes maximum, in other words, the load becomes maximum, at the resonating point (fr). In this apparatus, when the load is small, that is to say, when the amount of the current consumption at the secondary side of the transformer 806 is few, the oscillating frequency of the oscillating circuit 802 is increased to make the resonate current smaller. By such a servo circuit, the waste of the power consumption is reduced.

In the power supply apparatus illustrated in FIG. 8, when the output current at the secondary side becomes small, the voltage increases there so that the light emitted from the light emitting diode 809b of the photo coupler 809 becomes stronger, then the transistor 809b is made conductive to increase the voltage at a point Y. A feedback loop is constituted that the oscillating frequency of the oscillating circuit 802 becomes high in response to the voltage at the point Y to decrease the resonate current, and then the output voltage at the secondary side becomes down.

In the seventh embodiment, there is further provided a comparator 808a in the control circuit 808; to the minus terminal of the comparator 808a is supplied an output of the photo coupler 809, while the output terminal is connected to the reset terminal of the oscillator circuit 802, so that when the output of the photo coupler 809 becomes lower than a given value, a reset signal is outputted from the circuit 808 to stop the operation of the oscillator 802. The standard voltage for outputting the reset signal is, for instance, set up to a voltage at which an oscillating frequency for obtaining the condition that an output current at the secondary side of the transformer 806 becomes one to five of the maximum output current. According to such an arrangement, when the load current at the secondary side of the transformer 806 is small, the oscillation at the oscillating circuit 802 automatically becomes intermittently so that the power consumption can be reduced.

It should be noted that the structure of the power supply device for driving the oscillator 802 is omitted in FIG. 8. However, as the same to the above mentioned other embodiments, a capacitor 215 (reactance dropper) may be provided between the power supply device and the commercial power supply instead of an initiating resistance in order to reduce a heat or energy loss which would be generated there if the initiating resistance is provided.

Figure 10:
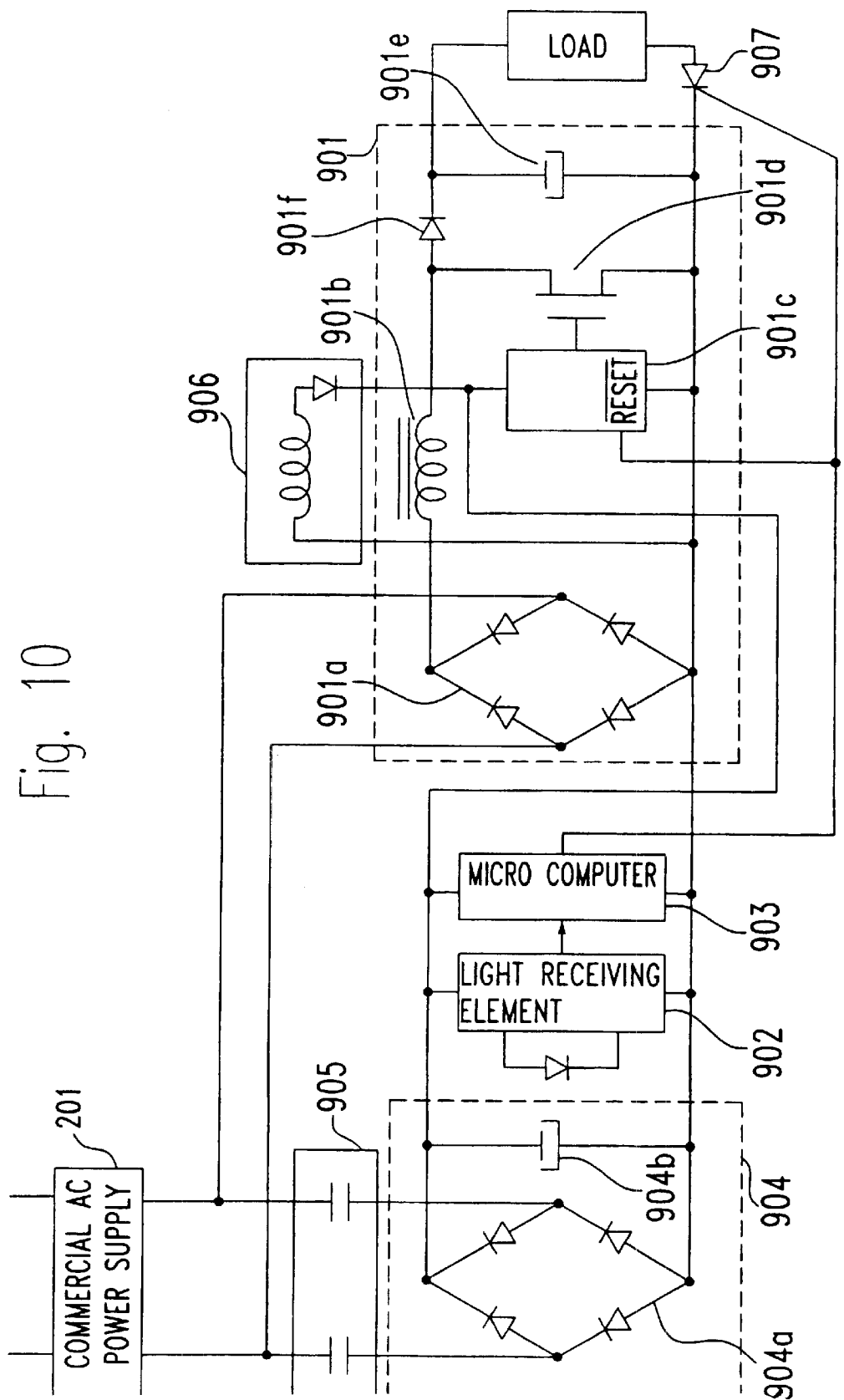
FIG. 10 is a circuit diagram depicting a construction of the eighth embodiment according to the present invention.

FIG. 10 is a circuit diagram representing a construction of the power supply apparatus according to the eighth embodiment of the present application. In the eight embodiment, the invention is applied to a power supply apparatus having no transformer where isolation is not required; such an apparatus is suitably applied to an electrical appliance where a great amount of power is consumed, such as an air conditioning system. In the apparatus, an active filter is provided in order to improve the power factor of the appliance.

As represented in FIG. 10, the apparatus comprises an active filter 901, a light receiving element 902 for receiving, for instance, a remote controlling signal from an outside, a micro computer element 903 for controlling the operation of the active filter 901 in response to the output of the light receiving element 902, an auxiliary power supply 905 for driving the light receiving element 902 and the micro computer element 903, and a capacitor 905 as a reactance dropper.

The electrical current from the commercial AC power supply 201 is supplied to the active filter 901, while supplied to the auxiliary power supply 904 via the capacitor 905. The current is stored in a capacitor 904*b* via a full wave rectifying circuit 904*a* to be used for driving the light receiving element 902, the micro computer element 903 and an oscillator 901*c* provided in the active filter 901. The active filter 901 comprises a full wave rectifying circuit 901*a*, a choke coil 901*b*, the oscillator 901*c*, a switching element 901*d*, a capacitor 901*e* for storing an electrical current and a diode 901*f*: the output terminal of the micro computer element 903 is connected to the reversed reset terminal of the oscillator 901*c* and a switch element (GTO) 907 of the load.

In the eighth embodiment, the current is supplied from the commercial AC power supply 201 to the capacitor 904*b* via capacitors 905. The capacitor 905 is provided instead of an initiating resistance so that the current going through the reactance component of the capacitor 905 is used to initiate the circuit 904. Therefore no energy loss is caused there. Since the power consumption at the light receiving element 902 and the micro computer element 903 is very little, the current obtained from the reactance dropper is enough to drive these elements.

Figure 12:
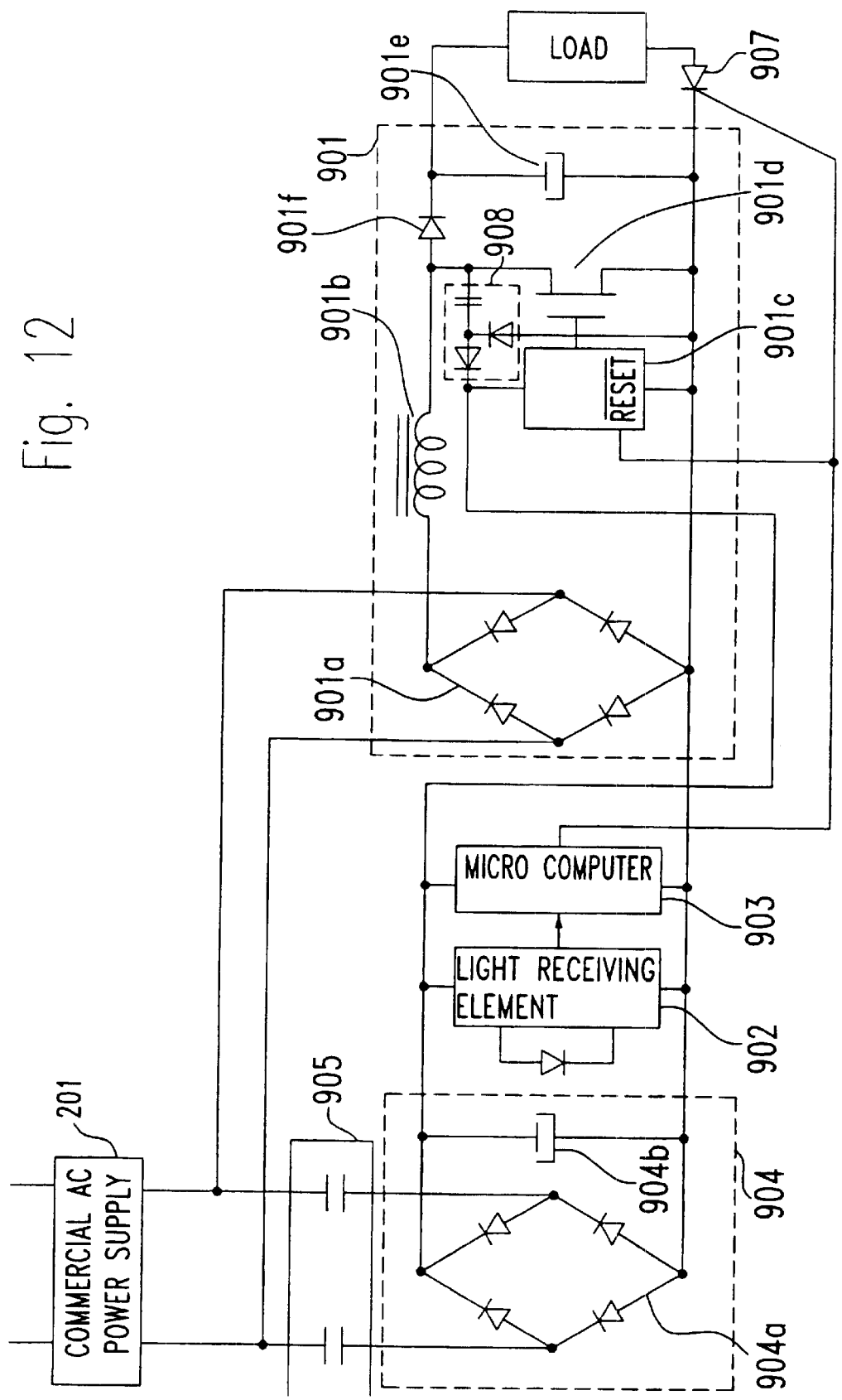
FIG. 12 is a circuit diagram representing a modification of the apparatus of the eighth embodiment.

In the active filter 901 of the eighth embodiment, a secondary coil is provided in the choke 901*b*. Apart of the energy generated when the electrical appliance is in a driving condition, in other words, when the active filter is operated, is taken into the oscillator 901*c*, so that the energy for driving the switch element 901*d* can be secured in a stable manner. As shown in FIG. 12, it may be possible to provide a capacitor 908 instead of the second coil 906 to drive the switching element 901*d* by taking a part of energy generated when the active filter is driven into the oscillator 901*c*. Further, if CMOSIC is used in the oscillator, almost no power is consumed in the oscillator when the appliance is in a standby mode.

Figure 11:
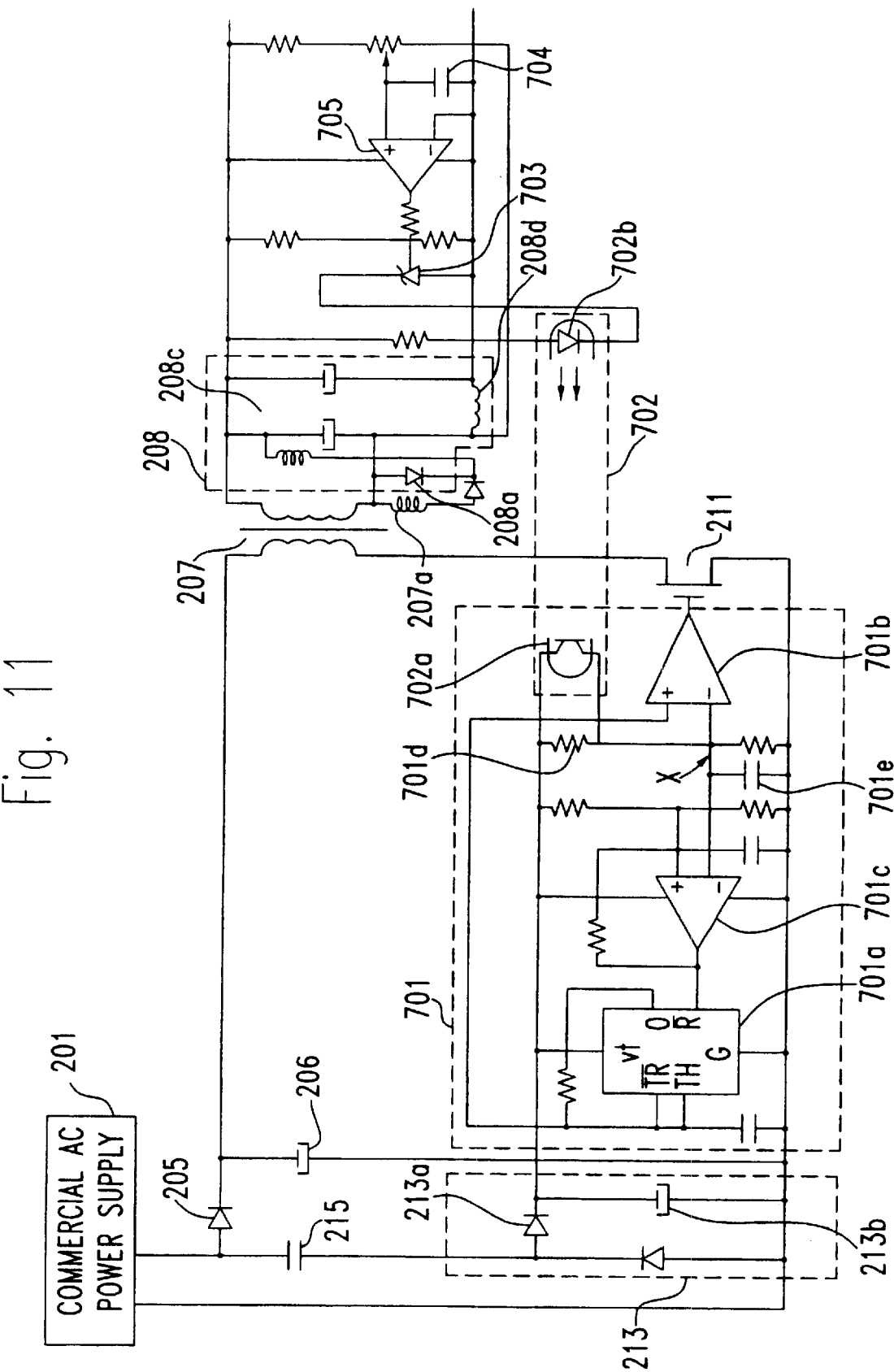
FIG. 11 is a circuit diagram illustrating a construction of the ninth embodiment according to the present invention.

FIG. 11 is a circuit diagram showing a construction of the power supply apparatus according to the ninth embodiment of the present invention. In the ninth embodiment, the circuit construction excepting the output part of the secondary side of the transformer 207 is the same as that of the sixth embodiment shown in FIG. 7.

As disclosed in the sixth embodiment, the duty cycle of the switching element 211 is detected and the intermittent operation of the switching element 211 is conducted corresponding to the amount of the duty cycle, but the output part of the secondary side of the transformer 207 has a constitution where flyback type circuit and forward type circuit are combined together. Out of the switching regulators having a single switching element, the regulator having a forward type circuit has an advantage that the efficiency is high and a great amount of power can be obtained, but has a disadvantage that it is difficult to control a reset current. On the other hand, in the flyback type circuit, the size of the transformer should be larger and a high efficiency cannot be expected, but easy to control it. In the ninth embodiment, there are provided a flyback type circuit and a third coil 207*a* for forming the forward circuit; the forward circuit is auxiliary added to the flyback type switching regulator to synthesize the output currents of both the circuits and to obtain the advantages of both the circuits.

That is to say, in the flyback type circuit, only when the appliance is in an ON mode, an energy is charged in the transformer; while, when the appliance is in an OFF mode, an energy is supplied to the load. However, by adding the forward type circuit there, even when the appliance is in ON mode, an energy is supplied not only to the transformer but also to the load and thus the energy to be charged into the transformer can be saved. Therefore, it is possible to make the size of the transformer small and to make the gap between the cores of transformer narrower due to the characteristic of the forward type circuit, so that the energy loss generated there can be reduced. However according to this way, since the forward current and flyback current which have different characteristics, respectively, are synthesized, it is necessary to pay attention to the coil ratio of the transformer so as not to make the forward current too great.

The present invention is not limited to the above mentioned embodiments, but many variations and modifications can be considered.

For instance, another technique for improving the power factor of the apparatus other than the above mentioned active filter, such that so-called C-less converter where a capacitor having a very little capacitance is used in the smoothing circuit at the primary side, can be applied to the above mentioned embodiments.

Further, it may be possible to add a capacitor in the switching regulators shown in FIGS. 2 and 7 in parallel to the primary side coil of the transformer so as to constitute a resonate circuit. According to such an arrangement, the energy loss of the switching element can be reduced more.

Furthermore, in the above mentioned embodiments, the reactance dropper is realized by using a capacitor instead of an initiating resistance, however, the capacitor can be substituted by an initiating resistance in the first to seventh and ninth embodiments.

In power supply apparatuses, an isolation between the primary side and the secondary side is an important task. As stated above, according to the invention, it is arranged such that the signal is sent from the secondary side to the primary side with the aid of a photo coupler. Therefore, it is possible to obtain an effect to save the consuming power while securing the isolation between the primary and secondary sides sufficiently. In the above mentioned embodiments the electrical load current at the secondary side of the transformer is directly detected, however, in the case that a voltage at the secondary side decreased when the amount of the electrical load current increases it, of course, may be possible to detect the current indirectly by measuring the change of the voltage.

It should be noted that the detection of the current may be directly done, however, in a case that the voltage is decreased when the electrical current increases, it may be possible to detect the current by detecting the decrease of the voltage.

As stated above, according to the present invention, the power which was consumed in an electrical appliance when the appliance is not used, i.e. in a standby mode, or the power which was consumed in an electrical appliance which should be always in a standby mode can be saved in a large extent.

What is claimed is:

1. A power supply apparatus comprising: an AC power supply; an active filter; a control circuit for controlling an operation of said active filter; a power supply for driving said control circuit;

a first capacitor provided between said AC power supply and said power supply for driving said control circuit; and an electric power storing means for rectifying an electrical current and storing the rectified current, which is going through a reactance component of said first capacitor, wherein said power supply for driving said control circuit is operated by the electrical current stored in said electric power storing means.

2. A power supply apparatus according to claim 1, wherein a choke coil of said active filter comprises a second winding, so that when a main unit to which said power supply apparatus is applied is in a driving condition, an electrical current is supplied into said electric power storing means not only from said first capacitor but also from said second winding.

3. A power supply apparatus according to claim 1, wherein said active filter comprises a second capacitor on its output circuit, so that when a main unit to which said power supply apparatus is applied is in a driving condition, an electrical power is supplied into said electric power storing means not only from said first capacitor but also from said second capacitor.

* * * * *